(12) United States Patent
Chen et al.

(10) Patent No.: US 9,304,547 B2
(45) Date of Patent: Apr. 5, 2016

(54) DATA ACCESS DEVICE CAPABLE OF ROTATING AND RETRACTING AND PORTABLE ELECTRONIC APPARATUS THEREWITH

(71) Applicant: Wistron Corporation, New Taipei (TW)

(72) Inventors: Jhih-Ming Chen, New Taipei (TW); Chia-Ching Lee, New Taipei (TW); Shou-Yi Cheng, New Taipei (TW); Ta-Chun Hsiung, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/302,402

(22) Filed: Jun. 11, 2014

(65) Prior Publication Data

US 2015/0227763 A1      Aug. 13, 2015

(30) Foreign Application Priority Data

Feb. 12, 2014     (TW) .............................. 103104635 A (51) Int. Cl.
*G06F 1/16* (2006.01)
*G07F 19/00* (2006.01)
*H04M 1/00* (2006.01)

(52) U.S. Cl.
CPC .............. *G06F 1/1632* (2013.01); *G07F 19/00* (2013.01); *H04M 1/00* (2013.01); *G06F 1/1626* (2013.01)

(58) Field of Classification Search
CPC ..... G06K 7/006; G06F 1/1632; G06F 1/1626; G06F 19/00; H04M 1/00
See application file for complete search history.

(56) References Cited

FOREIGN PATENT DOCUMENTS

TW           M363628           8/2009

OTHER PUBLICATIONS

Office Action mailed on May 25, 2015 for the Taiwan application No. 103104635, filing date: Feb. 12, 2014, p.1 line 11~14, p. 2 and p. 3 line 1~24.

*Primary Examiner* — Kristy A Haupt
(74) *Attorney, Agent, or Firm* — Winston Hsu; Scott Margo (57) ABSTRACT

A portable electronic apparatus includes a portable electronic device and a data access device installed on the portable electronic apparatus. The data access device includes a main body, a rotary arm and a sliding arm. The rotary arm is pivoted to the main body. When the rotary arm rotates to a folding position relative to the main body, the rotary arm is contained inside the main body. When the rotary arm rotates to a fixing position relative to the main body, the rotary arm protrudes out of the main body. The sliding arm is slidably disposed on the rotary arm so as to adjust a relative position between the sliding arm and the rotary arm. The sliding arm fixes the portable electronic device with the main body as the rotary arm rotates to the fixing position relative to the main body.

22 Claims, 12 Drawing Sheets

DATA ACCESS DEVICE CAPABLE OF ROTATING AND RETRACTING AND PORTABLE ELECTRONIC APPARATUS THEREWITH

BACKGROUND OF THE INVENTION

1. Field of the Invention

The present invention relates to a data access device capable of rotating and retracting and a portable electronic apparatus therewith, and more specifically, to a data access device capable of cooperating with portable electronic devices with different sizes and a portable electronic apparatus therewith.

2. Description of the Prior Art

In recently years, as a portable electronic apparatus, such as a tablet computer, is in widespread use, and an accessory electronic device, such as a card reader becomes more popular. A conventional card reader is usually connected to the tablet computer through a universal serial bus (USB) transmission cable as in use. However, the card reader is usually connected to the tablet computer only through the transmission cable without any other fixing structures. As moving the tablet computer, the card reader has to be separated from the tablet computer so that the card reader may not drop, thus the tablet computer can be carried, but it causes inconvenience in using the card reader. Therefore, it is an important issue to design a fixing structure for fixing the card reader on the tablet computer so as to conveniently carry the tablet computer and the card reader at the same time without separating the card reader from the tablet computer.

SUMMARY OF THE INVENTION

The present invention is to provide a data access device capable of rotating and retracting and a portable electronic apparatus therewith to solve the above drawbacks.

According to the disclosure, a data access device is installed on a portable electronic device. The data access device includes a main body, a rotary arm and a sliding arm. The main body includes a base plate, the rotary arm is pivoted to the base plate of the main body, and the sliding slot is formed on the rotary arm. The rotary arm is contained inside the main body as rotating to a folding position relative to the base plate, and the rotary arm protrudes out of the main body as rotating to a fixing position relative to the base plate. The sliding arm is slidably disposed on the sliding slot of the rotary arm so as to adjust a relative position of the sliding arm and the rotary arm, and the sliding arm fixes the portable electronic device with the main body as the rotary arm rotates to the fixing position relative to the base plate.

According to the disclosure, the main body further includes a connector and a socket, the connector is for electrically connecting to the portable electronic device, and a card is inserted in the socket.

According to the disclosure, an abutting surface and a stopping wall are formed on a side of the main body, and the sliding arm includes a sliding portion and a fastening portion. The sliding portion is slidably disposed inside the sliding slot of the rotary arm. The fastening portion is connected to an end of the sliding portion, the fastening portion hooks a side of the portable electronic device, and the abutting surface and the stopping wall respectively abut and stop another side of the portable electronic device as the rotary arm rotates to the fixing position relative to the base plate.

According to the disclosure, the data access device further includes a resilient component, an end of the resilient component is connected to an end of the sliding portion and the other end of the resilient component is connected to an end of the sliding slot away from the fastening portion, and the resilient component drives the sliding portion to approach the rotary arm as the fastening portion does not hook the side of the portable electronic device.

According to the disclosure, a cushion component is disposed on the fastening portion, and the cushion component contacts against the side of the portable electronic device as the fastening portion hooks the side of the portable electronic device.

According to the disclosure, at least one protruding portion is spaced on one of the rotary arm and the sliding arm, at least one concave portion is spaced on the other one of the rotary arm and the sliding arm, and the at least one concave portion is selectively engaged with the at least one protruding portion so as to adjust the relative position of the sliding arm and the rotary arm.

According to the disclosure, a first inclined surface is formed on the at least one protruding portion, a second surface is correspondingly formed on the at least one concave portion, and the first inclined surface cooperates with the second inclined surface to guide the at least one protruding portion to engage with or separate from the at least one concave portion as the sliding arm slides relative to the rotary arm.

According to the disclosure, a first engaging portion is formed on an end of the rotary arm, a second engaging portion is formed on an end of the sliding arm, and the second engaging portion is engaged with the first engaging portion as the sliding arm slides in a first direction relative to the rotary arm, so as to prevent the sliding arm from detaching from the rotary arm.

According to the disclosure, a stopping portion is disposed on the base plate, and the stopping portion is for stopping the rotary arm as the rotary arm rotates to a rotary limit position relative to the main body, so as to limit a rotary angle of the rotary arm and to prevent the rotary arm from overturning relative to the main body.

According to the disclosure, a recess is disposed on the base plate, and a protrusion is disposed on the sliding arm for engaging with the recess as the rotary arm rotates to the folding position relative to the main body.

According to the disclosure, the data access device further includes a pivoting shaft and a fixing component. The pivoting shaft rotatably passes through the rotary arm and the base plate, and the fixing component is for fixing the pivoting shaft so that the rotary arm is pivoted to the base plate.

According to the disclosure, a through hole is formed on the rotary arm, and the pivoting shaft rotatably passes through the through hole of the rotary arm and the base plate. The pivoting shaft is a bearing, and the fixing component is a screw for fixing the pivoting shaft on the main body.

According to the disclosure, a portable electronic apparatus includes a data access device and a portable electronic. The data access device is installed on the portable electronic device, and the data access device includes a main body, a rotary arm and a sliding arm. The main body includes a base plate, the rotary arm is pivoted to the base plate of the main body, and the sliding slot is formed on the rotary arm. The rotary arm is contained inside the main body as rotating to a folding position relative to the base plate, and the rotary arm protrudes out of the main body as rotating to a fixing position relative to the base plate. The sliding arm is slidably disposed on the sliding slot of the rotary arm so as to adjust a relative position of the sliding arm and the rotary arm, and the sliding arm fixes the portable electronic device with the main body as the rotary arm rotates to the fixing position relative to the base plate.

The data access device of the present invention can be fixed on the portable electronic device through the fastening portion cooperating with the abutting surface and stopping wall of the main body. Hence, the whole portable electronic apparatus can be carried without detaching the data access device from the portable electronic device. In addition, the relative position of the sliding arm and the rotary arm can be adjusted so as to adjust the total length of the sliding arm and the rotary arm for cooperating with the portable electronic devices with different sizes. The data access device can be separated from the portable electronic device, and the sliding arm and the rotary arm can rotate to the folding position so as to be contained inside the main body as the data access device is not in use.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
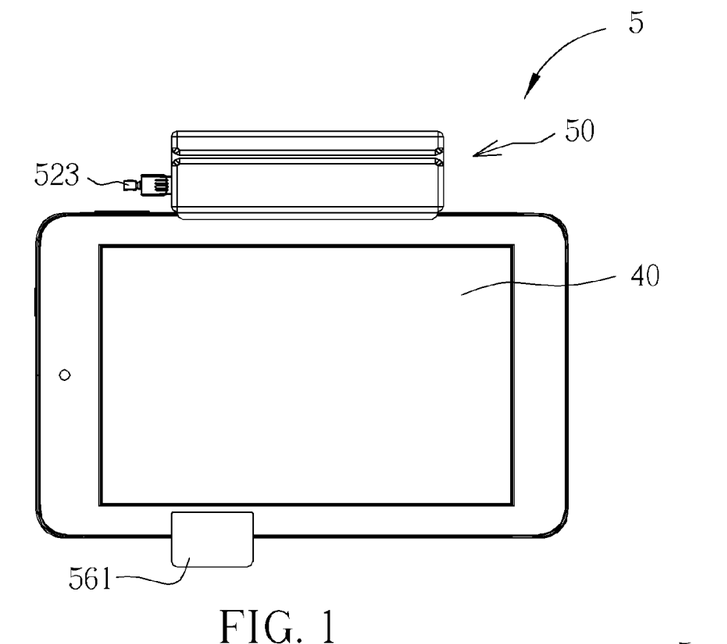
FIG. 1 is a schematic diagram of a portable electronic apparatus according to an embodiment of the present invention.
Figure 2:
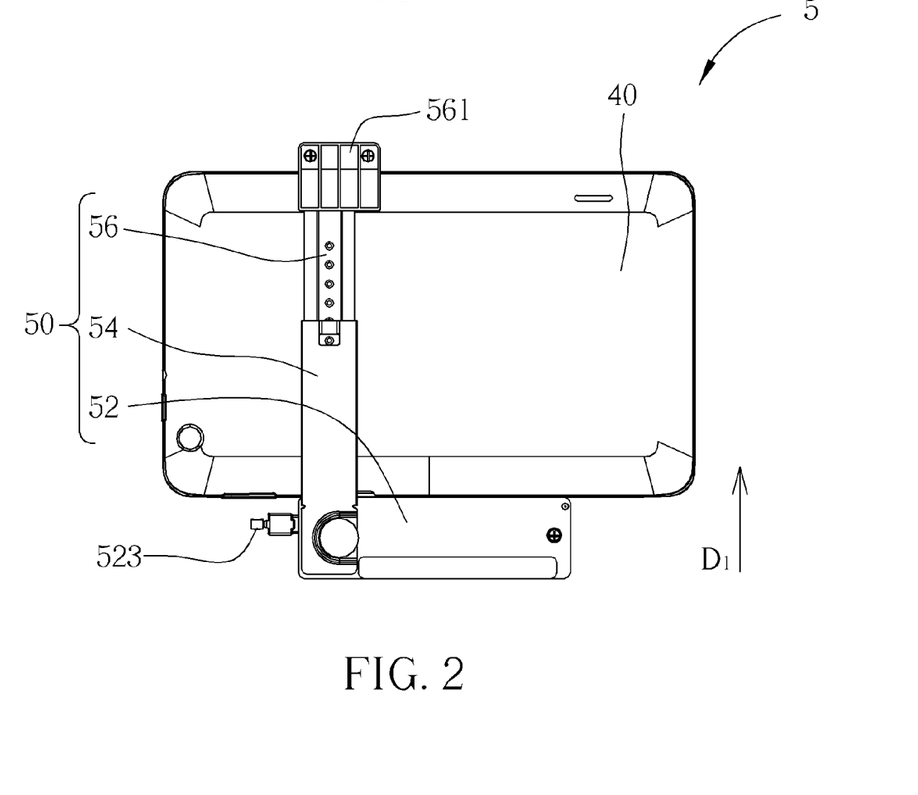
FIG. 2 is a rear diagram of the portable electronic apparatus according to the embodiment of the present invention.
Figure 3:
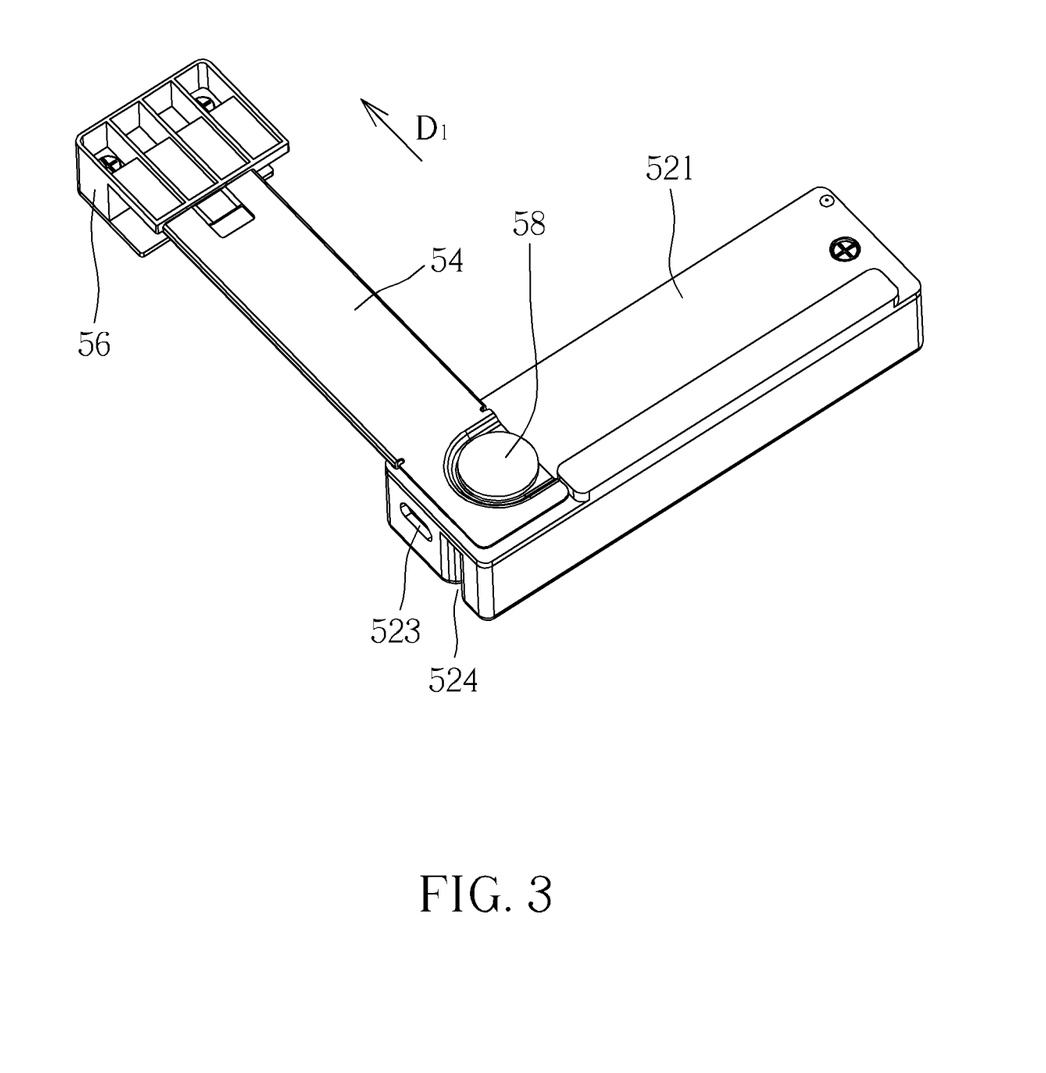
FIG. 3 is a schematic diagram of a data access device according to the embodiment of the present invention.
Figure 4:
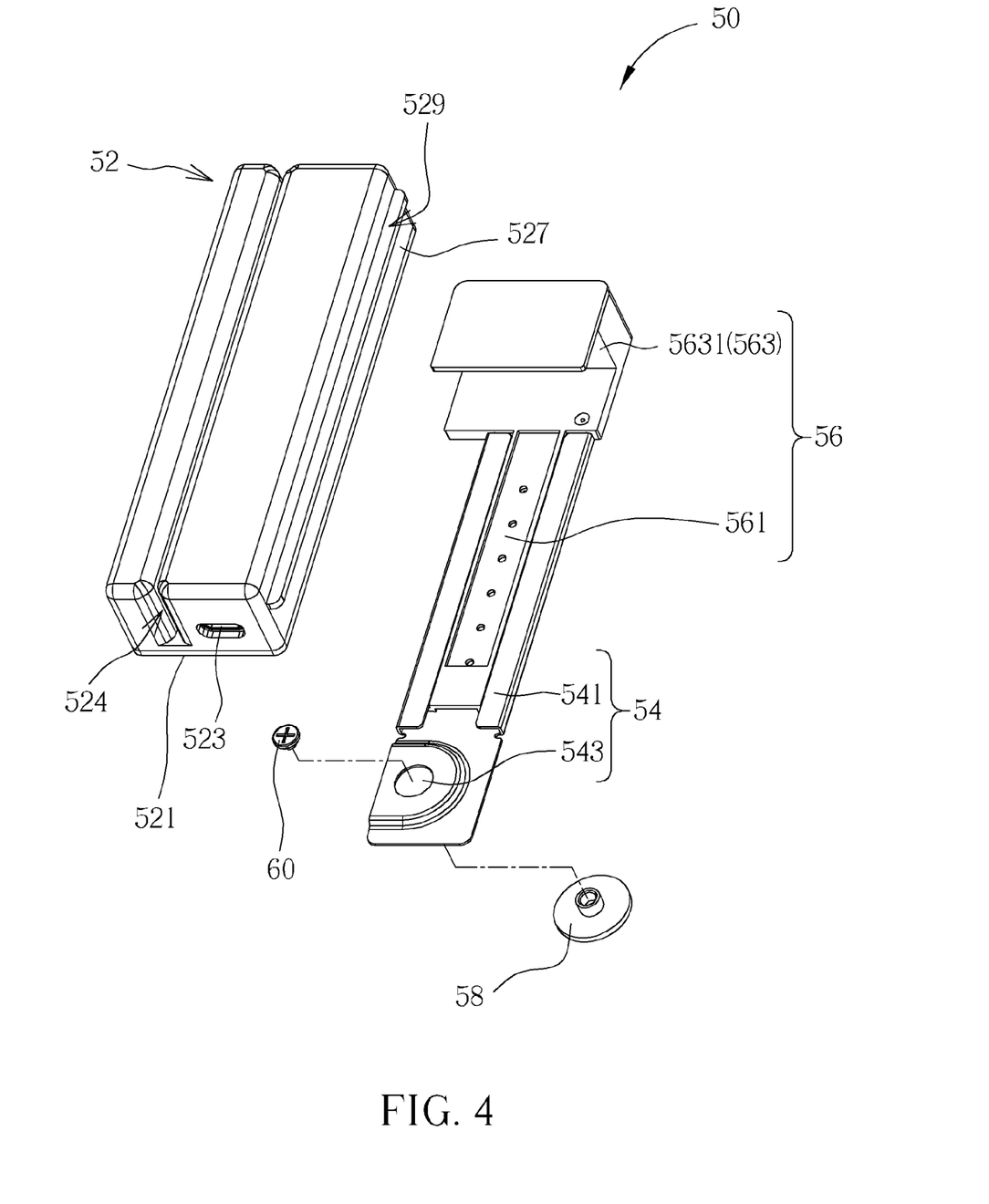
FIG. 4 is an exploded diagram of the data access device according to the embodiment of the present invention.

Please refer to FIG. 1 to FIG. 4. FIG. 1 is a schematic diagram of a portable electronic apparatus 5 according to an embodiment of the present invention. FIG. 2 is a rear diagram of the portable electronic apparatus 5 according to the embodiment of the present invention. FIG. 3 is a schematic diagram of a data access device 50 according to the embodiment of the present invention. FIG. 4 is an exploded diagram of the data access device 50 according to the embodiment of the present invention. The portable electronic apparatus 5 includes a portable electronic device 40 and the data access device 50 capable of rotating and retracting. The portable electronic device 40 can be a tablet computer or a notebook computer. The data access device 50 is detachably installed on the portable electronic device 40 and is electrically connected to the portable electronic device 40. The data access device 50 includes a main body 52, a rotary arm 54 and a sliding arm 56. The main body 52 includes a base plate 521, a connector 523 and a socket 524. The connector 523 is for electrically connecting to the portable electronic device 40, and a card (not shown in figures) can be inserted into the socket 524. The card can be an integrated circuit card (IC card), such as an automated teller machine card (ATM card), that is, the data access device 50 can be a chip card reader. In addition, the data access device 50 can be a multifunction card reader including a plurality of sockets 524 so that various of memory cards can be respectively inserted into the corresponding sockets 524. Furthermore, the connector 523 of the data access device 50 can be electrically connected to the portable electronic device 40 through a transmission cable, but not limit to this. For example, the connector 523 can be a universal serial bus (USB) plug and is installed on the sliding arm 56 so as to dock with the corresponding socket 524 of the portable electronic device 40.

The rotary arm 54 of the data access device 50 is pivoted to the base plate 521, a sliding slot 541 is formed on the rotary arm 54, and the sliding arm 56 is disposed on the sliding slot 541 of the rotary 54, so that the sliding arm 56 can slide relative to the rotary arm 54 in a first direction D1 as shown in FIG. 2. Hence, the relative position of the sliding arm 56 and the rotary arm 54 can be adjusted, and the data access device 50 can be installed on the portable electronic devices 40 with different sizes.

Figure 5:
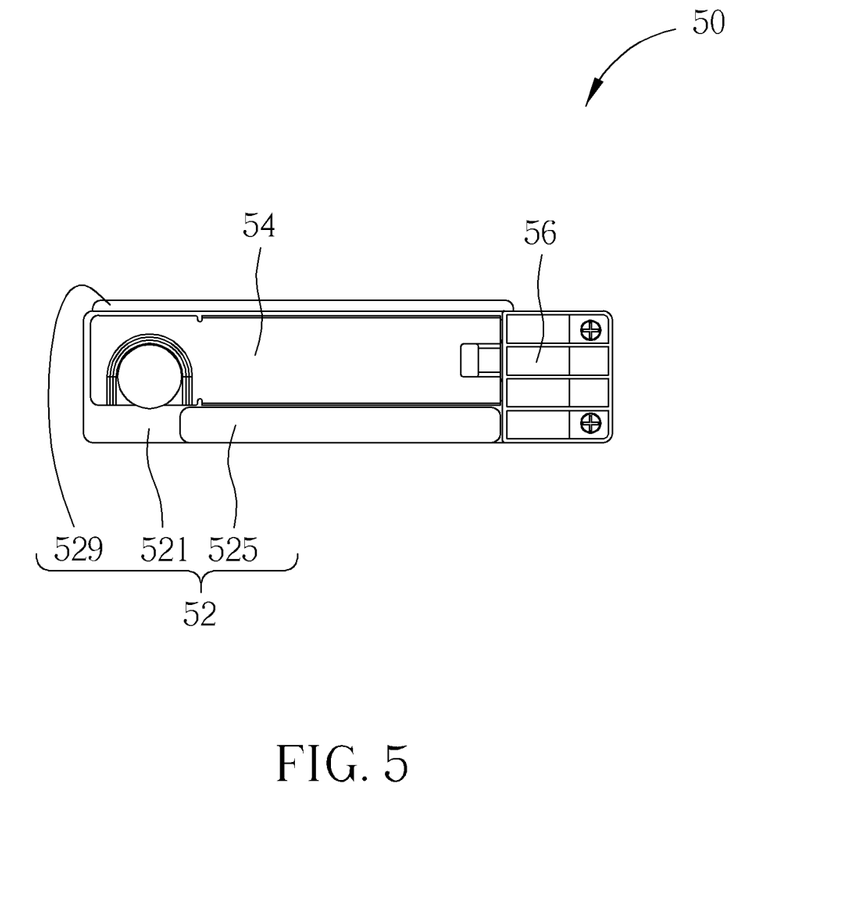
FIG. 5 to FIG. 7 are diagrams of the data access device as a rotary arm of the data access device rotates to different positions relative to a main body of the data access device according to the embodiment of the present invention.
Figure 6:
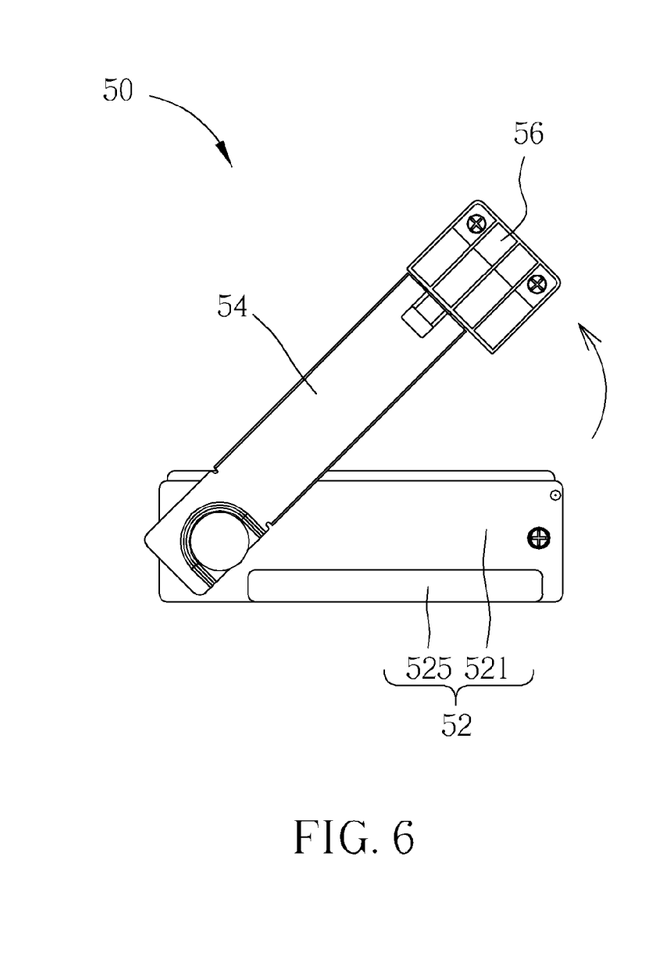
Figure 7:
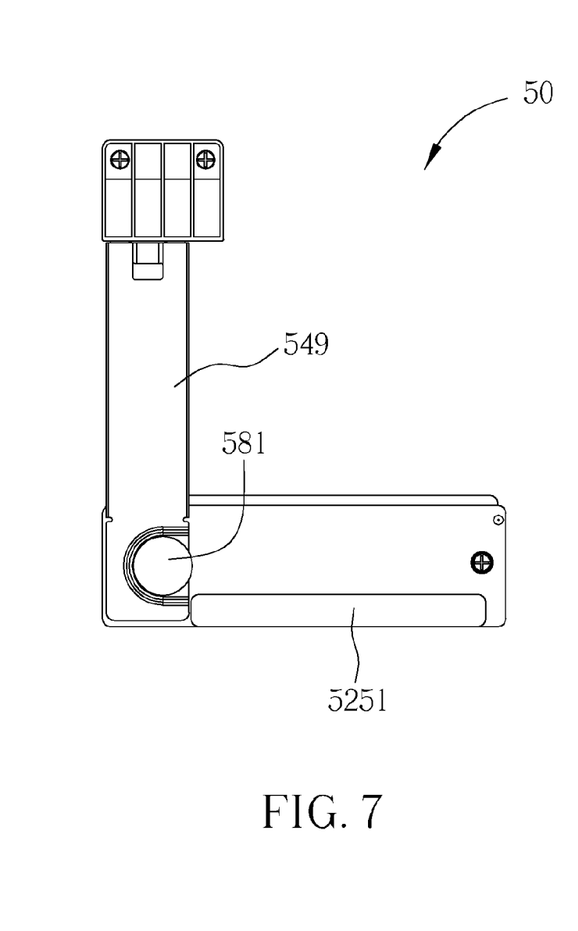
Figure 8:
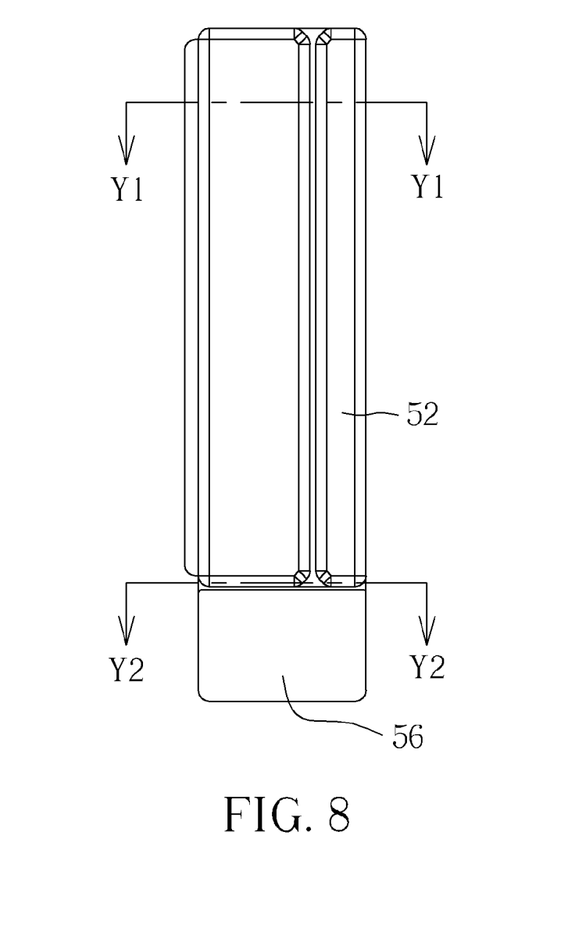
FIG. 8 is a diagram of the data access device being at a folding position according to the embodiment of the present invention.
Figure 9:
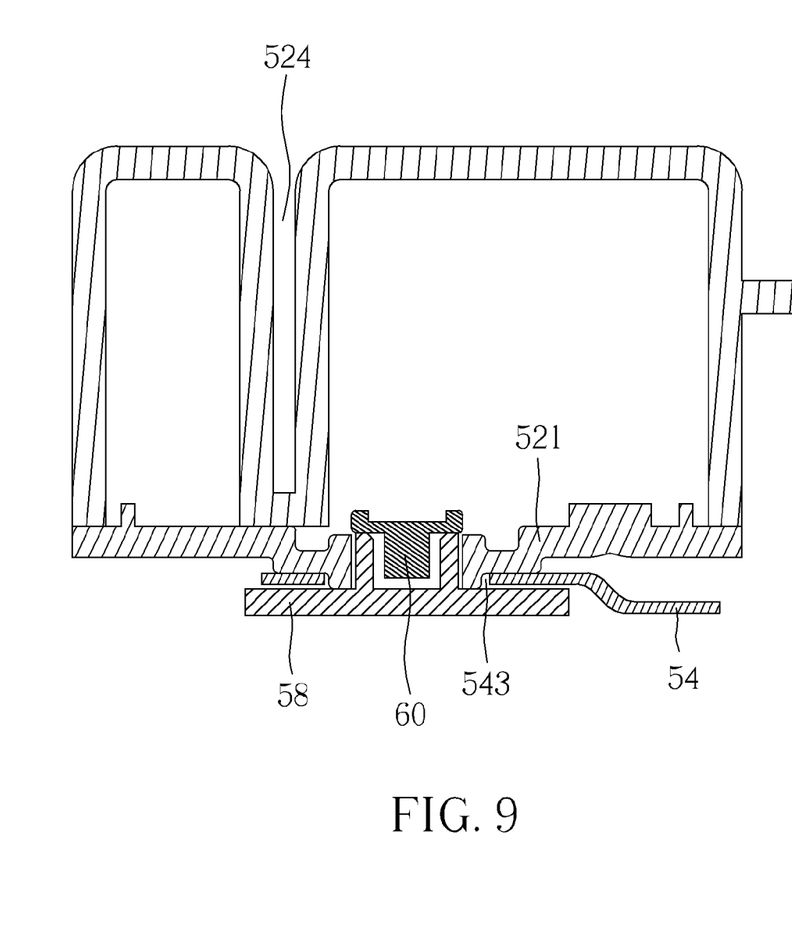
FIG. 9 is a cross-sectional diagram of the data access device being at the folding position along line Y1-Y1 in FIG. 8 according to the embodiment of the present invention.

Please refer to FIG. 4 to FIG. 7. FIG. 5 to FIG. 7 are diagrams of the data access device 50 as the rotary arm 54 of the data access device 50 rotates to different positions relative to the main body 52 of the data access device 50 according to the embodiment of the present invention. The rotary arm 54 is contained inside the main body 52 as rotating to a folding position relative to the base plate 521, as shown in FIG. 5. As the rotary arm 54 sequentially rotates counterclockwise from the folding position to a position shown in FIG. 6 and to a fixing position shown in FIG. 7 relative to the base plate 521, the rotary arm 54 protrudes out of the main body 52. The rotating direction is not limited in a counterclockwise direction. For example, the rotary arm 54 can be designed to rotate clockwise. Please refer to FIG. 4, FIG. 8 and FIG. 9. FIG. 8 is a diagram of the data access device 50 being at the folding position according to the embodiment of the present invention, and FIG. 9 is a cross-sectional diagram of the data access device 50 being at the folding position along line Y1-Y1 in FIG. 8 according to the embodiment of the present invention. The data access device 50 further includes a pivoting shaft 58 and a fixing component 60. A through hole 543 is formed on the rotary arm 54, and the pivoting shaft 58 rotatably passes through the through hole 543 of the rotary arm 54 and the base plate 521. The fixing component 60 is for fixing the pivoting shaft 58 on the main body 52, so that the rotary arm 54 is pivoted to the base plate 521. The pivoting shaft 58 can be a bearing, and the rotary arm 54 can pivot relative to the main body 52 more easily. A thread can be formed on the pivoting shaft 58, and the fixing component 60 is correspondingly a screw for screwing the pivoting shaft 58 on the main body 52.

Please refer to FIG. 2 and FIG. 4. An abutting surface 527 and a stopping wall 529 are formed on a side of the main body 52. The sliding arm 56 includes a sliding portion 561 and a fastening portion 563, the sliding portion 561 is slidably disposed the sliding slot 541 of the rotary arm 54 so that the sliding arm 56 can slide in the first direction D1 relative to the rotary arm 54. The fastening portion 563 is connected to an end of the sliding portion 561, the fastening portion 563 hooks a side of the portable electronic device 40, and the abutting surface 527 of the main body 52 and the stopping wall 529 respectively abut and stop another side of the portable electronic device 40 as the rotary arm 54 rotates to the fixing position relative to the base plate 521 shown in FIG. 7. Hence, the data access device is fixed on the portable electronic device 40 through the cooperation of the fastening component 563, the abutting surface 527 and the stopping wall 529. That is, the sliding arm 56 cooperates with the main body 52 to fix the portable electronic device 40 as the rotary arm 54 rotates to the fixing position relative to the base plate 521. In addition, a cushion component 5631 is disposed on the fastening portion 563, and the cushion component 5631 contacts against the side of the portable electronic device 40 as the fastening portion 563 hooks the side of the portable electronic device 40, so as to provide buffer protection to prevent the fastening portion 563 from overpressing to damage the portable electronic device 40. Furthermore, the cushion component 5631 can reduce a tolerance between the fastening portion 563 and the portable electronic device 40 with different sizes, so that the fastening portion 563 can tightly hook the portable electronic device 40.

Figure 10:
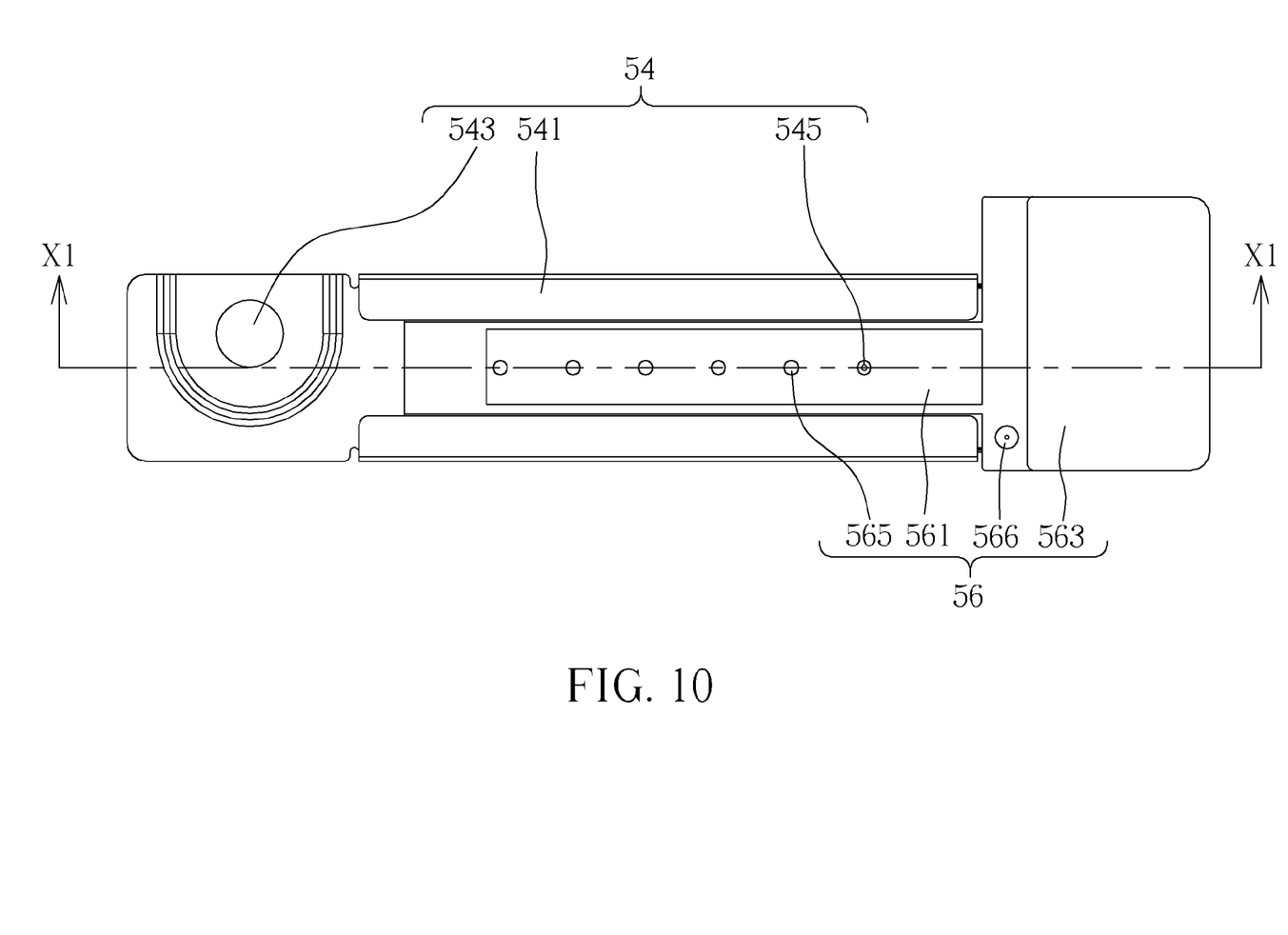
FIG. 10 is a diagram of the rotary arm and a sliding arm being at a fixing position according to the embodiment of the present invention.
Figure 11:
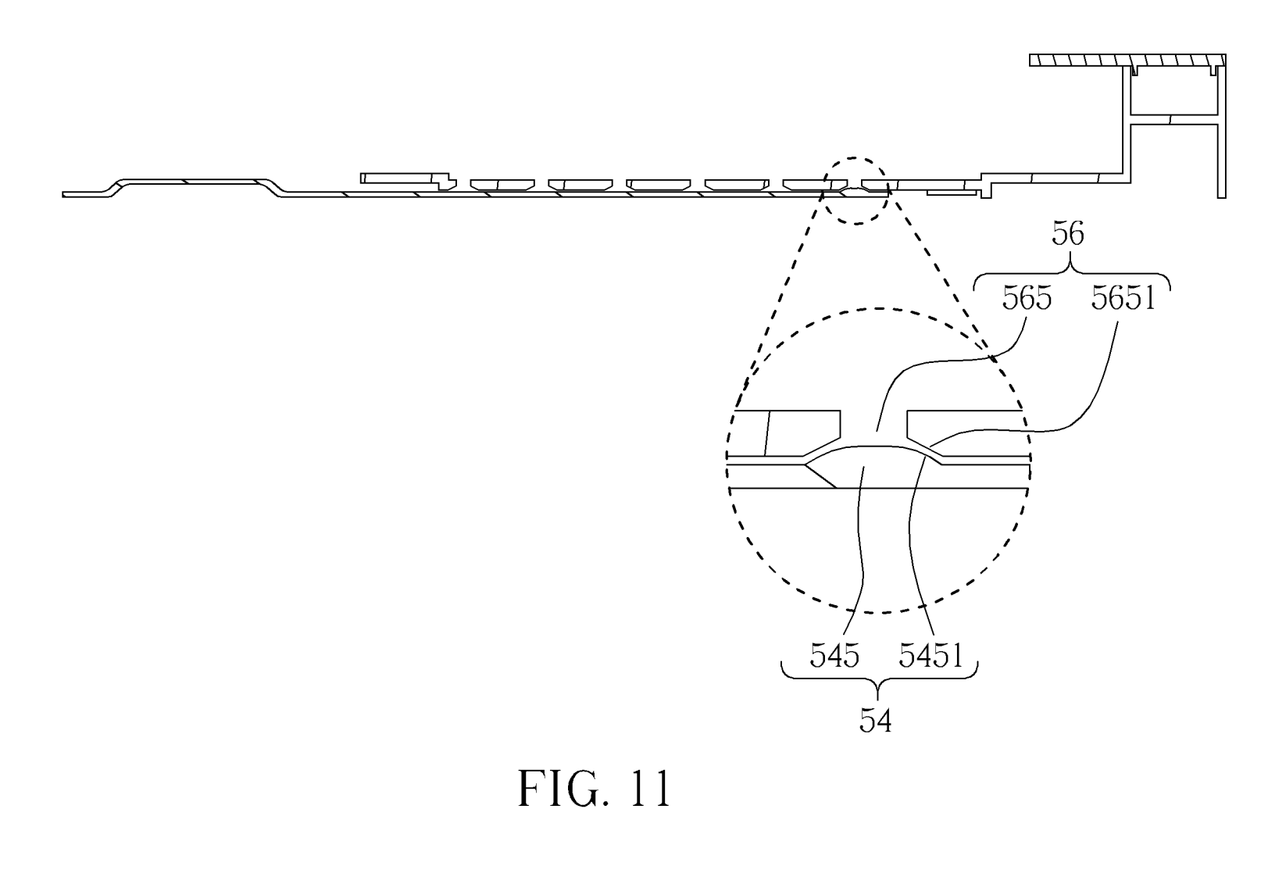
FIG. 11 is a partial cross-sectional diagram of the rotary arm and the sliding arm along line X1-X1 in FIG. 10 according to the embodiment of the present invention.
Figure 12:
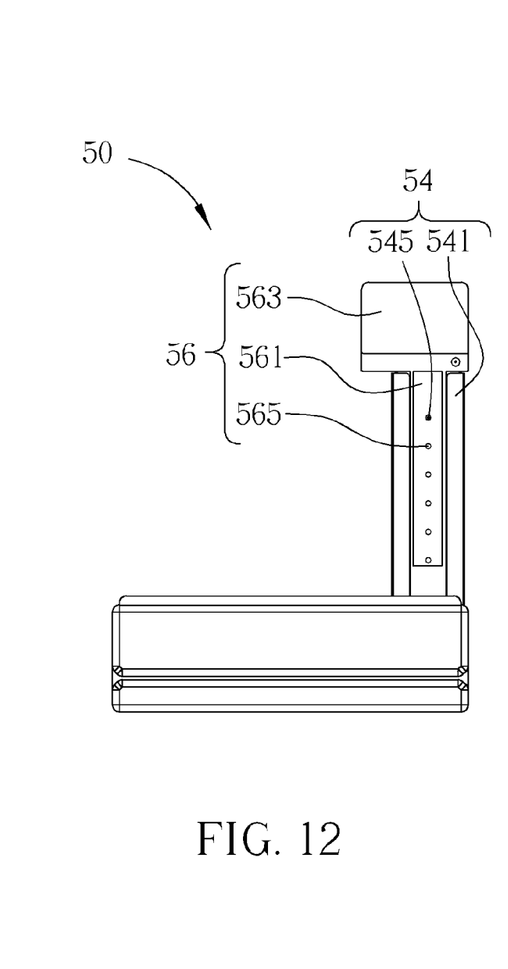
FIG. 12 to FIG. 14 are diagrams of the data access device as the sliding arm slides to different positions relative to the rotary arm according to the embodiment of the present invention.
Figure 13:
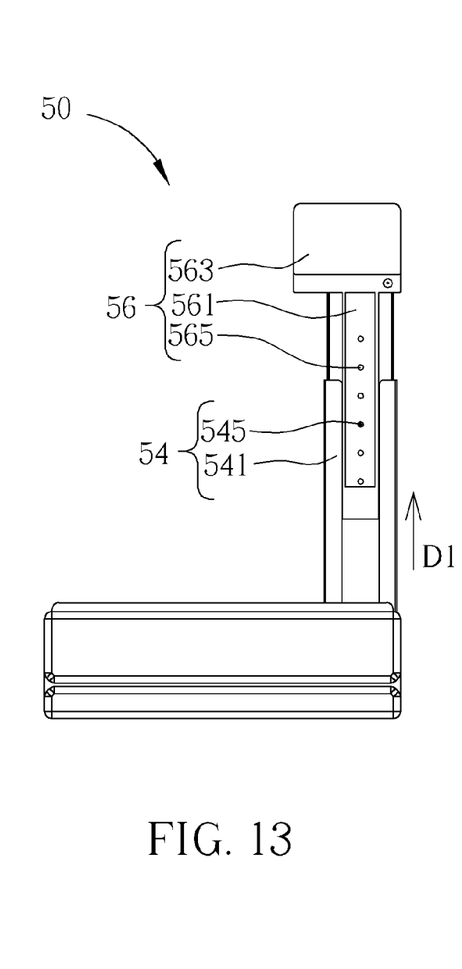
Figure 14:
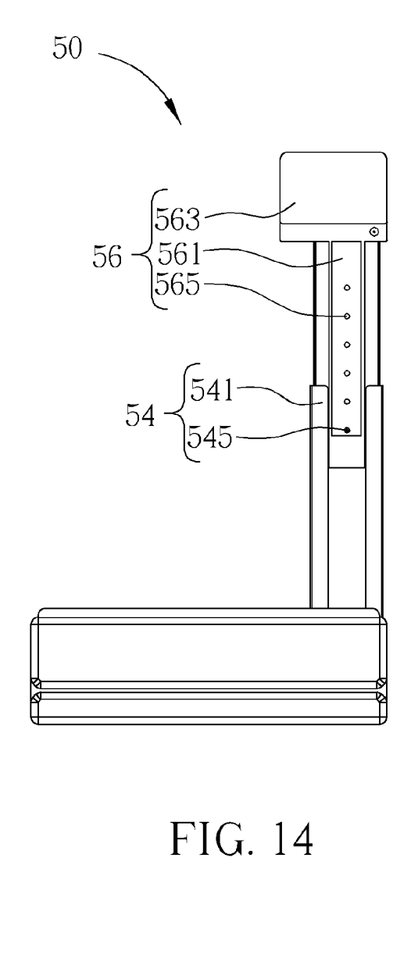

Please refer to FIG. 10 and FIG. 14. FIG. 10 is a diagram of the rotary arm 54 and the sliding arm 56 being at the fixing position according to the embodiment of the present invention. FIG. 11 is a partial cross-sectional diagram of the rotary arm 54 and the sliding 56 arm along line X1-X1 in FIG. 10 according to the embodiment of the present invention. FIG. 12 to FIG. 14 are diagrams of the data access device 50 as the sliding arm 56 slides to different positions relative to the rotary arm 54 according to the embodiment of the present invention. At least one protruding portion 545 is spaced on one of the rotary arm 54 and the sliding arm 56, and at least one concave portion 565 is spaced on the other one of the rotary arm 54 and the sliding arm 56. The at least one concave portion 565 is selectively engaged with the at least one protruding portion 545 so as to adjust the relative position of the sliding arm 56 and the rotary arm 54, so that a total length of the sliding arm 56 and the rotary arm 54 can be adjusted. As the at least one protruding portion 545 is engaged with the at least one concave portion 565, the total length of the sliding arm 56 and the rotary arm 54 is simultaneously fixed, as shown in FIG. 11. According to the embodiment, a single protruding portion 545 is formed on the rotary arm 54, and a plurality of concave portions 565 is formed on the sliding arm 56. Not limited to this, for example, a plurality of protruding portions 545 can be formed on the rotary arm 54, and a single concave portion 565 can be formed on the sliding arm 56. Or a plurality of protruding portions 545 can be formed on the rotary arm 54, and a plurality of concave portions 565 can be formed on the sliding arm 56. Or at least one protruding portion 545 can be formed on the sliding arm 56, and at least one concave portion 565 can be correspondingly formed on the sliding arm 56. It depends on the practical requirement. A first inclined surface 5451 is formed on each of the protruding portion 545, and a second inclined surface 5651 is correspondingly formed on the concave portion 565. The first inclined surface 5451 cooperates with the second inclined surface 5651 to guide the protruding portion 545 to engage with or separate from the corresponding concave portion 565 as the sliding arm 56 slides relative to the rotary arm 54.

Figure 15:
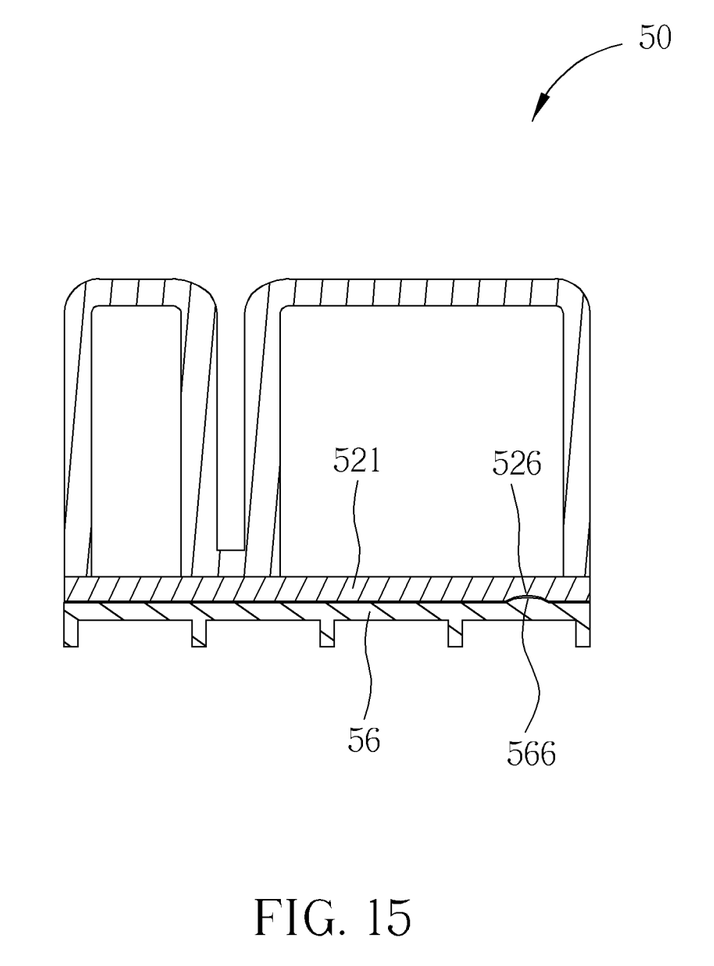
FIG. 15 is a cross-sectional diagram of the data access device being at the folding position along line Y2-Y2 in FIG. 8 according to the embodiment of the present invention.

Please refer to FIG. 5, FIG. 8 and FIG. 15. FIG. 15 is a cross-sectional diagram of the data access device 50 being at a folding position along line Y2-Y2 in FIG. 8 according to the embodiment of the present invention. A recess 526 is disposed on the base plate 521, and a protrusion 566 is disposed on the sliding arm 56 for engaging with the recess 526 as the rotary arm 54 rotates to the folding position relative to the base plate 521 of the main body 52. Hence, the rotary arm 54 cannot detach from the main body 52 at the folding position, and the sliding arm 56 cannot slide relative to the rotary arm 54 at the folding position so as not to change the total length of the sliding arm 56 and the rotary arm 54, so that the data access device 50 is fixed for conveniently being carried.

Please refer to FIG. 5 to FIG. 7. The main body 52 further includes a stopping portion 525 disposed on the base plate 521, and the stopping portion 525 is for stopping the rotary arm 54 as the rotary arm 54 rotates to a rotary limit position shown in FIG. 7 relative to the main body 52, so as to limit a rotary angle of the rotary arm 54 and to prevent the rotary arm 54 from overturning relative to the base plate 521 of the main body 52. In addition, the rotary arm 54 abuts the stopping portion 525 at the folding position shown in FIG. 5, so as to limit the rotary angle of the rotary arm 54. According to this embodiment, the stopping portion 525 limits the rotary angle of the rotary arm 54 from exceeding 90 degrees. In addition, the stopping portion 525 includes a first surface 5251, the pivoting shaft 58 includes a second surface 581, and the rotary arm 54 includes a third surface 549. The first surface 5251, the second surface 581 and the third surface 549 can be coplanar, so that the data access device 50 can be stably placed on the desk through the support of the first surface 5251, the second surface 581 and the third surface 549.

Figure 16:
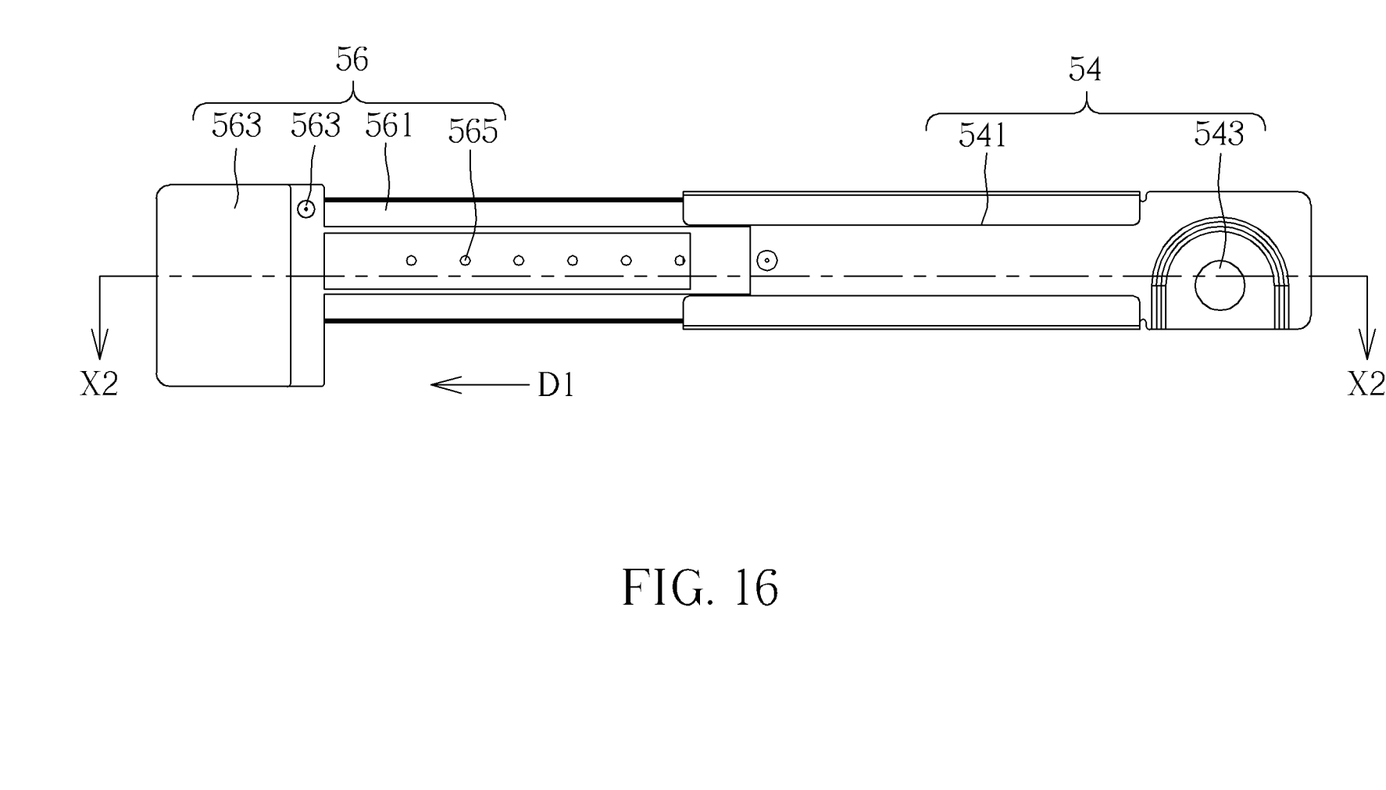
FIG. 16 is a diagram of the sliding arm sliding to a sliding limit position relative to the rotary arm according to the embodiment of the present invention.
Figure 17:
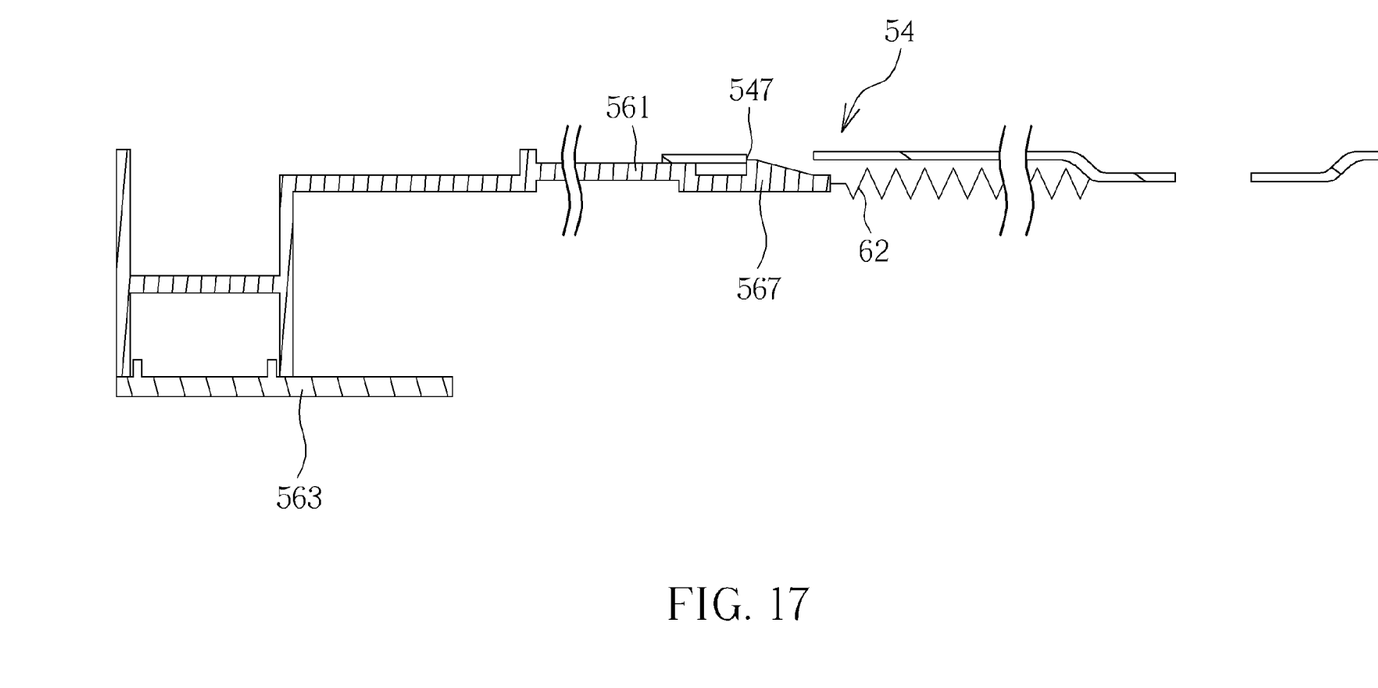
FIG. 17 is a partial cross-sectional diagram of the rotary arm and the sliding arm along line X2-X2 in FIG. 16 according to the embodiment of the present invention.

Please refer to FIG. 16 and FIG. 17. FIG. 16 is a diagram of the sliding arm 56 sliding to a sliding limit position relative to the rotary arm 54 according to the embodiment of the present invention. FIG. 17 is a partial cross-sectional diagram of the rotary arm 54 and the sliding arm 56 along line X2-X2 in FIG. 16 according to the embodiment of the present invention. A first engaging portion 547 is formed on an end of the rotary arm 54 far away from the through hole 543, and a second engaging portion 567 is formed on an end of the sliding arm 56 far away from the fastening portion 563. The second engaging portion 567 is engaged with the first engaging portion 547 as the sliding arm 56 slides in the first direction D1 relative to the rotary arm 54, so as to prevent the sliding arm 56 from detaching from the rotary arm 54. According to the embodiment, the first engaging portion 547 is a sunken portion, and the sunken portion can be formed in a stamping manner, the second engaging portion 567 can be a rib, and an inclined surface is formed on a side of the second engaging portion 567 close to the through hole 543 for guiding the second engaging portion 567 to engage with the first engaging portion 547.

In addition, please refer to FIG. 2, FIG. 16 and FIG. 17. The data access device 50 further includes a resilient component 62, an end of the resilient component 62 is connected to an end of the sliding portion 561, and the other end of the resilient component 62 is connected to an end of the sliding slot 541 away from the fastening portion 563. The resilient component 62 provides resilient force so that the fastening portion 563 can tightly fasten the portable electronic device 40, as the fastening portion 563 hooks the side of the portable electronic device 40. Furthermore, the resilient component 62 drives the sliding portion 561 to approach the through hole 543 of the rotary arm 54, so as to receive the sliding arm 56 inside the rotary arm 54 as the fastening portion 563 does not hook the side of the portable electronic device 40.

In contrast to the prior art, the data access device of the present invention can be fixed on the portable electronic device through the fastening portion cooperating with the abutting surface and stopping wall of the main body. Hence, the whole portable electronic apparatus can be carried without detaching the data access device from the portable electronic device. In addition, the relative position of the sliding arm and the rotary arm can be adjusted so as to adjust the total length of the sliding arm and the rotary arm for cooperating with the portable electronic devices with different sizes. The data access device can be separated from the portable electronic device, and the sliding arm and the rotary arm can rotate to the folding position so as to be contained inside the main body as the data access device is not in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data access device installed on a portable electronic device, the data access device comprising:
   a main body comprising a base plate;
   a rotary arm pivoted to the base plate of the main body, a sliding slot being formed on the rotary arm, the rotary arm being contained inside the main body as rotating to a folding position relative to the base plate, and the rotary arm protruding out of the main body as rotating to a fixing position relative to the base plate; and
   a sliding arm slidably disposed on the sliding slot of the rotary arm so as to adjust a relative position of the sliding arm and the rotary arm, and the sliding arm fixing the portable electronic device with the main body as the rotary arm rotates to the fixing position relative to the base plate.

2. The data access device of claim 1, wherein the main body further comprises a connector and a socket, the connector is for electrically connecting to the portable electronic device, and a card is inserted in the socket.

3. The data access device of claim 1, wherein an abutting surface and a stopping wall are formed on a side of the main body, and the sliding arm comprises:
   a sliding portion slidably disposed inside the sliding slot of the rotary arm; and
   a fastening portion connected to an end of the sliding portion, the fastening portion hooking a side of the portable electronic device and the abutting surface and the stopping wall respectively abutting and stopping another side of the portable electronic device as the rotary arm rotates to the fixing position relative to the base plate.

4. The data access device of claim 3 further comprising a resilient component, an end of the resilient component being connected to an end of the sliding portion and the other end of the resilient component being connected to an end of the sliding slot away from the fastening portion, and the resilient component driving the sliding portion to approach the rotary arm as the fastening portion does not hook the side of the portable electronic device.

5. The data access device of claim 3, wherein a cushion component is disposed on the fastening portion, and the cushion component contacts against the side of the portable electronic device as the fastening portion hooks the side of the portable electronic device.

6. The data access device of claim 1, wherein at least one protruding portion is spaced on one of the rotary arm and the sliding arm, at least one concave portion is spaced on the other one of the rotary arm and the sliding arm, and the at least one concave portion is selectively engaged with the at least one protruding portion so as to adjust the relative position of the sliding arm and the rotary arm.

7. The data access device of claim 6, wherein a first inclined surface is formed on the at least one protruding portion, a second surface is correspondingly formed on the at least one concave portion, and the first inclined surface cooperates with the second inclined surface to guide the at least one protruding portion to engage with or separate from the at least one concave portion as the sliding arm slides relative to the rotary arm.

8. The data access device of claim 1, wherein a first engaging portion is formed on an end of the rotary arm, a second engaging portion is formed on an end of the sliding arm, and the second engaging portion is engaged with the first engaging portion as the sliding arm slides in a first direction relative to the rotary arm, so as to prevent the sliding arm from detaching from the rotary arm.

9. The data access device of claim 1, wherein a stopping portion is disposed on the base plate, and the stopping portion is for stopping the rotary arm as the rotary arm rotates to a rotary limit position relative to the main body, so as to limit a rotary angle of the rotary arm and to prevent the rotary arm from overturning relative to the main body.

10. The data access device of claim 1, wherein a recess is disposed on the base plate, and a protrusion is disposed on the sliding arm for engaging with the recess as the rotary arm rotates to the folding position relative to the main body.

11. The data access device of claim 1, further comprising:
    a pivoting shaft rotatably passing through the rotary arm and the base plate; and
    a fixing component for fixing the pivoting shaft, so that the rotary arm is pivoted to the base plate.

12. The data access device of claim 11, wherein a through hole is formed on the rotary arm, and the pivoting shaft rotatably passes through the through hole of the rotary arm and the base plate, the pivoting shaft is a bearing, and the fixing component is a screw for fixing the pivoting shaft on the main body.

13. A portable electronic apparatus comprising:
    a portable electronic device; and
    a data access device installed on the portable electronic device, the data access device comprising:
       a main body comprising a base plate;
       a rotary arm pivoted to the base plate of the main body, a sliding slot being formed on the rotary arm, the rotary arm being contained inside the main body as rotating to a folding position relative to the base plate, and the rotary arm protruding out of the main body as rotating to a fixing position relative to the base plate; and
       a sliding arm slidably disposed on the sliding slot of the rotary arm so as to adjust a relative position of the sliding arm and the rotary arm, and the sliding arm fixing the portable electronic device with the main body as the rotary arm rotates to the fixing position relative to the base plate.

14. The portable electronic apparatus of claim 13, wherein the main body further comprises a connector and a socket, the connector is for electrically connecting to the portable electronic device, and a card is inserted in the socket.

15. The portable electronic apparatus of claim 13, wherein an abutting surface and a stopping wall is formed on a side of the main body, and the sliding arm comprises:
   a sliding portion slidably disposed inside the sliding slot of the rotary arm; and
   a fastening portion connected to an end of the sliding portion, the fastening portion hooking a side of the portable electronic device, and the abutting surface and the stopping wall abutting and stopping other side of the portable electronic device as the rotary arm rotates to the fixing position relative to the base plate.

16. The portable electronic apparatus of claim 13, wherein at least one protruding portion is spaced on one of the rotary arm and the sliding arm, at least one concave portion is spaced on the other one of the rotary arm and the sliding arm, and the at least one concave portion is selectively engaged with the at least one protruding portion so as to adjust the relative position of the sliding arm and the rotary arm.

17. The portable electronic apparatus of claim 16, wherein a first inclined surface is formed on the at least one protruding portion, a second surface is correspondingly formed on the at least one concave portion, and the first inclined surface cooperates with the second inclined surface to guide the at least one protruding portion to engage with or separates from the at least one concave portion as the sliding arm slides relative to the rotary arm.

18. The portable electronic apparatus of claim 13, wherein a first engaging portion is formed on an end of the rotary arm, a second engaging portion is formed on an end of the sliding arm, and the second engaging portion is engaged with the first engaging portion as the sliding arm slides in a first direction relative to the rotary arm, so as to prevent the sliding arm from detaching from the rotary arm.

19. The portable electronic apparatus of claim 13, wherein a stopping portion is disposed on the base plate, the stopping portion is for stopping the rotary arm as the rotary arm rotates to a rotary limit position relative to the main body, so as to limit a rotary angle of the rotary arm and to prevent the rotary arm from overturning relative to the main body.

20. The portable electronic apparatus of claim 13, wherein a recess is disposed on the base plate, and a protrusion is disposed on the sliding arm for engaging with the recess as the rotary arm rotates to the folding position relative to the main body.

21. The portable electronic apparatus of claim 13 further comprising:
   a pivoting shaft rotatably passing through the rotary arm and the base plate; and
   a fixing component for fixing the pivoting shaft, so that the rotary arm is pivoted to the base plate.

22. The portable electronic apparatus of claim 21, wherein a through hole is formed on the rotary arm, the pivoting shaft rotatably passes through the through hole of the rotary arm and the base plate, the pivoting shaft is a bearing, and the fixing component is a screw for fixing the pivoting shaft on the main body.

* * * * *